July 22, 1952  B. J. VIDMAR  2,603,985

METHOD OF REPOINTING DIPPER TEETH

Filed Sept. 29, 1949

INVENTOR
BENNIE J. VIDMAR
BY
Richard P. Cardew
AGENT

Patented July 22, 1952

2,603,985

UNITED STATES PATENT OFFICE 2,603,985

METHOD OF REPOINTING DIPPER TEETH

Bennie J. Vidmar, Mount Iron, Minn.

Application September 29, 1949, Serial No. 118,670

2 Claims. (Cl. 76—101)

This invention relates to a method of repointing dipper teeth such as are used on power shovels and the like.

It is well known that the teeth which are used on dippers or buckets of power shovels wear out quite fast. These teeth are usually of manganese, cast or forged steel, or the like, and are quite expensive. Several teeth are used at a time on each bucket making it too costly to discard the teeth when worn. There has been a constant search for a satisfactory means to repoint these teeth, however, none of the means have proven too successful. One of the most common methods used is to weld a wedge bar of manganese steel to the shank of the worn teeth after the end has been cut off square to receive the wedge bar. This method, however, is not satisfactory as the heat treatment of the teeth is lost due to the excessive heat applied to the tooth during the cutting and welding process, as the welding must be done all the way through, and not just on the outer edges, between the bar and the tooth. This work requires a highly skilled welder to do a good job and not spoil the heat treatment of the tooth. If the heat treatment is spoiled, the tooth will break off very easily when it is put into use.

It is one of my principal objects to provide an entirely different method and means for repointing worn dipper teeth.

Another object is to repoint dipper teeth in such a way that the degree of skill required to put out a good job is greatly reduced.

Another object is to repoint dipper teeth in such a manner that there is little, if any, danger of spoiling the heat treatment of a dipper tooth.

Another, more specific, object is to provide a wedge-shaped cap having a substantially wedge-shaped cavity therein into which the worn end of a dipper tooth may be secured to provide a new point for the tooth.

Another object is to provide a repoint or cap for a dipper tooth that may be removed readily when worn and replaced with a new cap and put back into service.

These and other objects and advantages become more apparent as the description of my invention proceeds.

In the accompanying drawing forming a part of my application:

Figure 1:
Fig. 1 is a front elevational view of one form of worn dipper tooth, and showing the original size and shape thereof in dotted lines.
Figure 2:
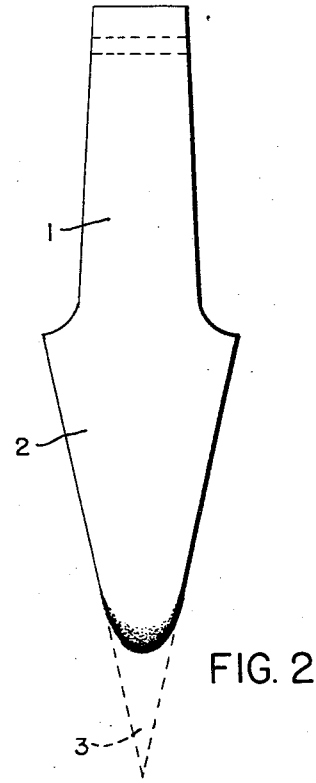
Fig. 2 is a side elevational view of Fig. 1.

In the drawing, the reference numeral 1 indicates the shank portion of a dipper tooth and 2 indicates the portion of a tooth which is employed in digging. The tooth here shown has been used and worn to the point where it is no longer efficient for digging, the original size and shape thereof being indicated in dotted lines at 3 in Figs. 1 and 2.

It is deemed obvious that it would be quite expensive to discard a tooth which is worn as shown as the major portion thereof is still in excellent condition. It is therefore important to provide means to repair or repoint the worn tooth for greatest economy.

Figure 3:
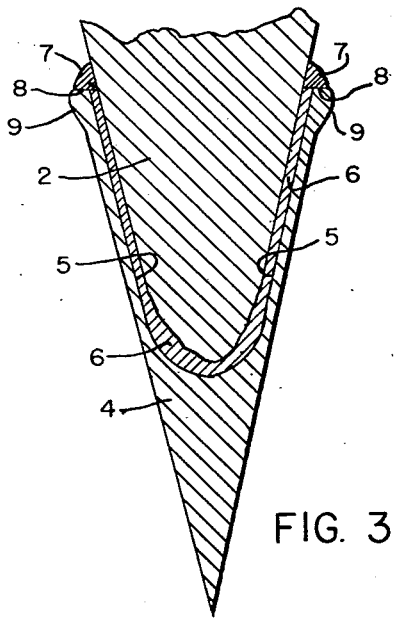
Fig. 3 is an enlarged central vertical sectional view of a worn dipper tooth which has been repointed in accordance with my invention.
Figure 4:
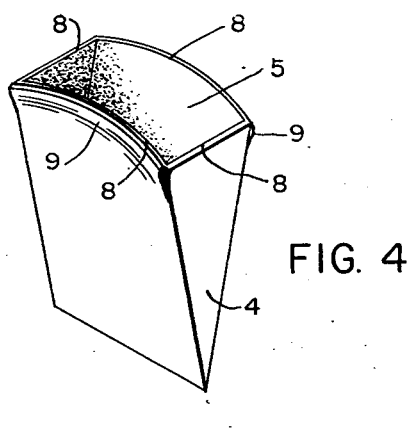
Fig. 4 is a perspective view of one form of my repoint cap for dipper teeth.

I have shown in Fig. 4 a molded or cast wedge-shaped cap 4 which is preferably of the same material from which the original tooth is made and has slightly larger outside dimensions to that of the original tooth. The cap 4 is provided with a cavity or chamber which also is of dimensions greater than the original tooth except in depth. As seen in Fig. 3, the depth of the cavity is such that the worn end of a tooth may be inserted therein and there will be a space between the tooth and the walls of the cavity, the reason for which will become apparent. The lower end of the cap is solid to replace the metal of the original tooth.

In repointing a tooth, the worn end thereof is inserted into the cavity or chamber 5 as shown and suspended therein as nearly centered as possible with respect to the walls of the chamber 5, as shown. The space between the walls of the chamber and the worn tooth is then filled to the upper rim thereof with zinc 6, or similar metal, which is poured thereinto when in a molten state. The metal 6 fills in all the irregularities which are present in the tooth end, as well as the space between the walls of the chamber and the tooth so that a snug fit is made for the cap on the tooth and it can not wiggle loose when the repointed tooth is in use.

The metal 6 is allowed to cool, and it is to be understood that the metal 6 does not weld itself to the tooth or to the walls of the chamber in the cap. This feature permits the ready removal of the cap after the repointed tooth has been used, and also permits the reclaiming of the metal 6 for further use.

After the zinc has cooled, the upper edges 8 of the cap are welded to the face of the tooth as shown at 7, this securely fastens the cap to the tooth to stand the rough use to which it may be put, it being deemed apparent that the welding may be done entirely around the upper rim of the cap, or along particular sections thereof, such as the front and rear face. It may be desired to provide the cap 4 with bulges 9 along its upper rim as shown to provide ample stock for welding purposes.

By letting the metal 6 cool before the welding is done, no bubbles and gases occur in the metal 6 which may weaken the bond of the cap on the tooth or which may permit the cap to wiggle on the tooth, and thereby result in unexpected breakage.

It is deemed apparent that it will not require as highly skilled workman to repoint teeth using my improved method, as the welding to be done is not extensive nor deep as in previous methods. In addition, there is practically no chance of spoiling the heat treatment of the teeth as they are not subject to extremely high temperatures for any great period because the welding required is so little, and because the molten zinc or other metal 6 is not hot enough to bring the temperature of the tooth to the point required to spoil the heat treatment. These features of my invention provide great advantages over any heretofore known.

It may be readily seen that a tooth which has been recapped or repointed by my method may be reclaimed over and over again as it is comparatively simple to release the welded fastening of the cap to the tooth with a cutting torch so that the cap may be forced off the tooth.

Having thus described my invention, what I claim is:

1. The method of repointing a worn dipper tooth which comprises inserting the worn end of said tooth into a preshaped cavity in a molded cap, filling said cavity around said tooth with molten metal having nonfusing qualities with respect to the tooth, cooling said molten metal, and then welding the upper edges of said cap to said tooth.

2. The method of repointing a worn dipper tooth which comprises fitting a molded cap over the worn end of said tooth, filling said cap with molten metal to fill the space between said tooth and said cap, cooling the metal, and welding the upper edges of said cap to the adjacent portions of said tooth.

BENNIE J. VIDMAR.

REFERENCES CITED

The following references are of record in the file of this patent:

UNITED STATES PATENTS

| Number | Name | Date |
|---|---|---|
| 531,051 | Marquart | Dec. 18, 1894 |
| 1,743,890 | Harrington | Jan. 14, 1930 |
| 1,804,756 | Elwood | May 12, 1931 |
| 2,148,925 | Bochy | Feb. 28, 1939 |
| 2,308,569 | St. Clair | Jan. 19, 1943 |
| 2,317,932 | Moore | Apr. 27, 1943 |
| 2,334,755 | Eglinton | Nov. 23, 1943 |
| 2,369,285 | Daniels et al. | Feb. 13, 1945 |
| 2,433,001 | Mork | Dec. 23, 1947 |